(12) United States Patent
Natsume

(10) Patent No.: US 11,548,463 B2
(45) Date of Patent: Jan. 10, 2023

(54) VEHICLE SEAT

(71) Applicant: TOYOTA BOSHOKU KABUSHIKI KAISHA, Aichi-ken (JP)

(72) Inventor: Hiroaki Natsume, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/679,753

(22) Filed: Feb. 24, 2022

(65) Prior Publication Data
US 2022/0297628 A1 Sep. 22, 2022

(30) Foreign Application Priority Data
Feb. 26, 2021 (JP) .............................. JP2021-029788

(51) Int. Cl.
| B60R 21/207 | (2006.01) |
|---|---|
| B60R 21/2165 | (2011.01) |
| B60N 2/58 | (2006.01) |
| B60R 21/231 | (2011.01) |
| B60N 2/64 | (2006.01) |

(52) U.S. Cl.
CPC .............. B60R 21/207 (2013.01); B60N 2/58 (2013.01); B60N 2/646 (2013.01); B60R 21/2165 (2013.01); *B60R 2021/23146* (2013.01)

(58) Field of Classification Search
None
See application file for complete search history.

(56) References Cited

U.S. PATENT DOCUMENTS

| 9,688,231 | B2 * | 6/2017 | Saito | ................. B60R 21/207 |
|---|---|---|---|---|
| 9,738,197 | B2 * | 8/2017 | Tanabe | ................... B60N 2/72 |
| 9,751,488 | B1 * | 9/2017 | Saito | ................. B60R 21/207 |
| 10,569,682 | B2 * | 2/2020 | Tanabe | ................. B60R 21/207 |
| 2021/0078518 | A1 * | 3/2021 | Tanabe | ................... B60R 21/26 |

FOREIGN PATENT DOCUMENTS

| CN | 103167973 A | * | 6/2013 | ............. B60N 2/289 |
|---|---|---|---|---|
| CN | 111002942 A | * | 4/2020 | ........... B60R 21/207 |
| JP | 2017-121869 A |  | 7/2017 |  |
| JP | 2017165412 A | * | 9/2017 |  |

* cited by examiner

*Primary Examiner* — Faye M Fleming
(74) *Attorney, Agent, or Firm* — Greenblum & Bernstein, P.L.C.

(57) ABSTRACT

A vehicle seat including: a back frame that forms a framework of a seat back; a back pad including a cushion material attached to a seated person side of the back frame; a back cover that covers a seated person side of the back pad; and an airbag unit that is attached to the back frame, the airbag unit including an airbag, wherein a break portion that allows the airbag to expand and deploy is formed to the back cover, wherein a fabric member that is difficult to stretch than the back cover is disposed between the break portion and the back frame, and wherein a buffer member that prevents damage due to abutment is attached to a portion of the fabric member which may abut with a part of the back frame in a process in which the airbag is expanded and deployed.

6 Claims, 5 Drawing Sheets

VEHICLE SEAT

CROSS-REFERENCE TO RELATED APPLICATIONS

This application is based upon and claims the benefit of priority from prior Japanese patent application No. 2021-029788, filed on Feb. 26, 2021, the entire contents of which are incorporated herein by reference.

TECHNICAL FIELD

The present disclosure relates to a vehicle seat.

BACKGROUND ART

In related art, there is known a vehicle seat of a vehicle in which an airbag unit is disposed inside a seat back, and when an impact load is applied to the vehicle from a side of the vehicle, an airbag of the airbag unit is expanded and deployed to an outside of the seat back to protect a body of a seated occupant. JP-A-2017-121869 discloses this type of vehicle seat, in which the airbag unit is disposed on a back side of a back pad, and the back pad on a front side of the airbag unit is provided with a through hole serving as an expansion path of the airbag. A back cover that covers the back pad of such vehicle seat is provided in a tensioned state, and a sewn line portion that is broken by the expansion and deployment of the airbag is disposed along the through hole. In the vicinity of the sewn line portion, a stay cloth, which is a low-stretch cloth having a function of preventing stretching of the back cover in an initial stage of the expansion and deployment of the airbag so as to reliably open the sewn line portion, is sewn.

In the technique described in JP-A-2017-121869, the airbag unit is attached to a seated person side of a back pan made of a resin plate which is attached to the seated person side of a metal back frame. A pair of stay clothes are disposed around the airbag unit so as to connect between the sewn line portion of the back cover and a bracket fixing the airbag unit to the back pan. Here, when the airbag is expanded and deployed, the stay clothes do not come into contact with metal parts such as a back frame. However, there is a possibility that a part of the stay clothes may come into contact with the back frame when the airbag is expanded and deployed, for example, in a case where one end portion side of the stay cloth is directly attached to the back frame. In such a case, if the back frame includes a sharp edge portion, there is a problem that when the airbag is expanded and deployed, the stay clothes may be damaged by the sharp edge portion, and the function of the stay clothes may not be sufficiently exerted.

SUMMARY

The present disclosure provides a vehicle seat in which a stay cloth that promotes opening of a sewn line portion of a back cover at a time of expansion and deployment of an airbag is prevented from coming into contact with a sharp edge portion of a back frame and being damaged.

According to an aspect of the present disclosure, there is provided a vehicle seat including: a back frame that forms a framework of a seat back; a back pad including a cushion material attached to a seated person side of the back frame; a back cover that covers a seated person side of the back pad; and an airbag unit that is attached to the back frame, the airbag unit including an airbag, wherein a break portion that allows the airbag to expand and deploy is formed to the back cover, wherein a fabric member that is difficult to stretch than the back cover is disposed between the break portion and the back frame, and wherein a buffer member that prevents damage due to abutment is attached to a portion of the fabric member which may abut with a part of the back frame in a process in which the airbag is expanded and deployed.

Accordingly, in the vehicle seat, even if a sharp edge or the like is present in a portion of the back frame with which the fabric member may abut in the process in which the airbag is expanded and deployed, the buffer member can reinforce the fabric member to avoid the damage to the fabric member. Accordingly, the break portion of the back cover can be reliably opened by an action of the fabric member to thereby expand and deploy the airbag. Further, since it is only necessary to attach the fabric member to which the buffer member is attached to the back frame, it is not necessary to attach other parts such as a protector to the back frame, and thus, assembling workability of the vehicle seat is good.

DESCRIPTION OF EMBODIMENTS

Figure 1:
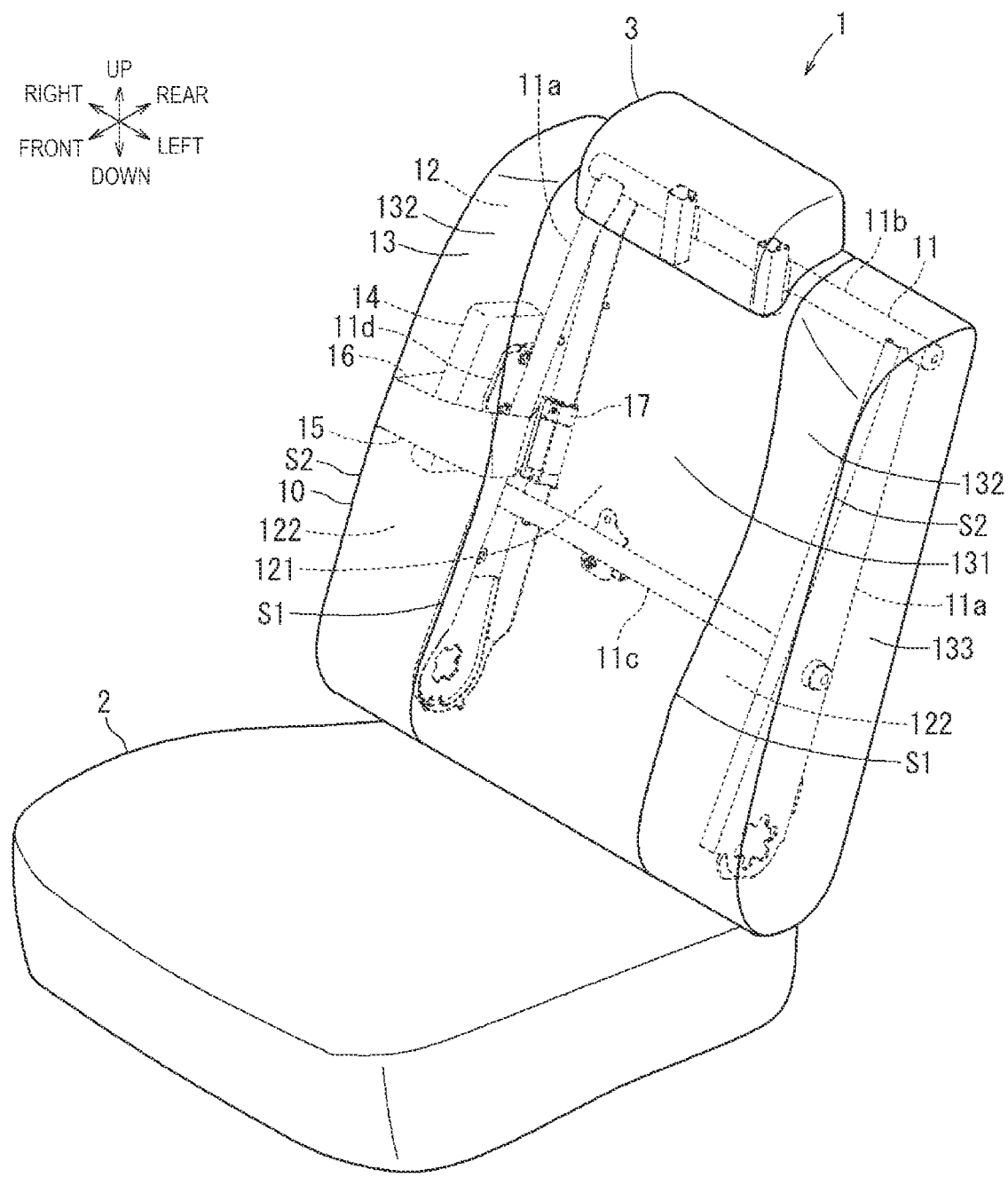
FIG. 1 is a perspective view of a seat back of an automobile seat according to an embodiment of the present disclosure.

FIGS. 1 to 7 show an embodiment of the present disclosure. This embodiment is an example in which the present disclosure is applied to an automobile seat 1. In the drawings, arrows indicate directions of an automobile and the automobile seat 1 when the automobile seat 1 is attached to the automobile. In the following description, description relating to the directions uses these directions as a reference. The automobile seat 1 of the present embodiment includes a seat cushion 2 serving as a seating portion, a seat back 10 serving as a backrest, and a headrest 3 that supports a head. Since the seat cushion 2 and the headrest 3 have a known configuration, the description thereof will be omitted, and the seat back 10 will be described. Here, the automobile seat 1 corresponds to the "vehicle seat" in the claims.

As shown in FIGS. 1 to 4, the seat back 10 has a structure in which a back pad 12 made of urethane foam, which is a cushion material, is placed on a back frame 11 forming a framework thereof, and the back pad 12 is covered with a back cover 13 which is a covering material from above.

The back frame 11 is a member formed in a substantially rectangular frame shape in a front view by connecting upper portions of a pair of left and right side frames 11a, which are pressed members having a substantially U-shaped cross section extending in a vertical direction, with an upper frame 11b which is a pipe member, and connecting central portions of the pair of left and right side frames 11a in the vertical direction with a center frame 11c which is a pipe member.

Figure 4:
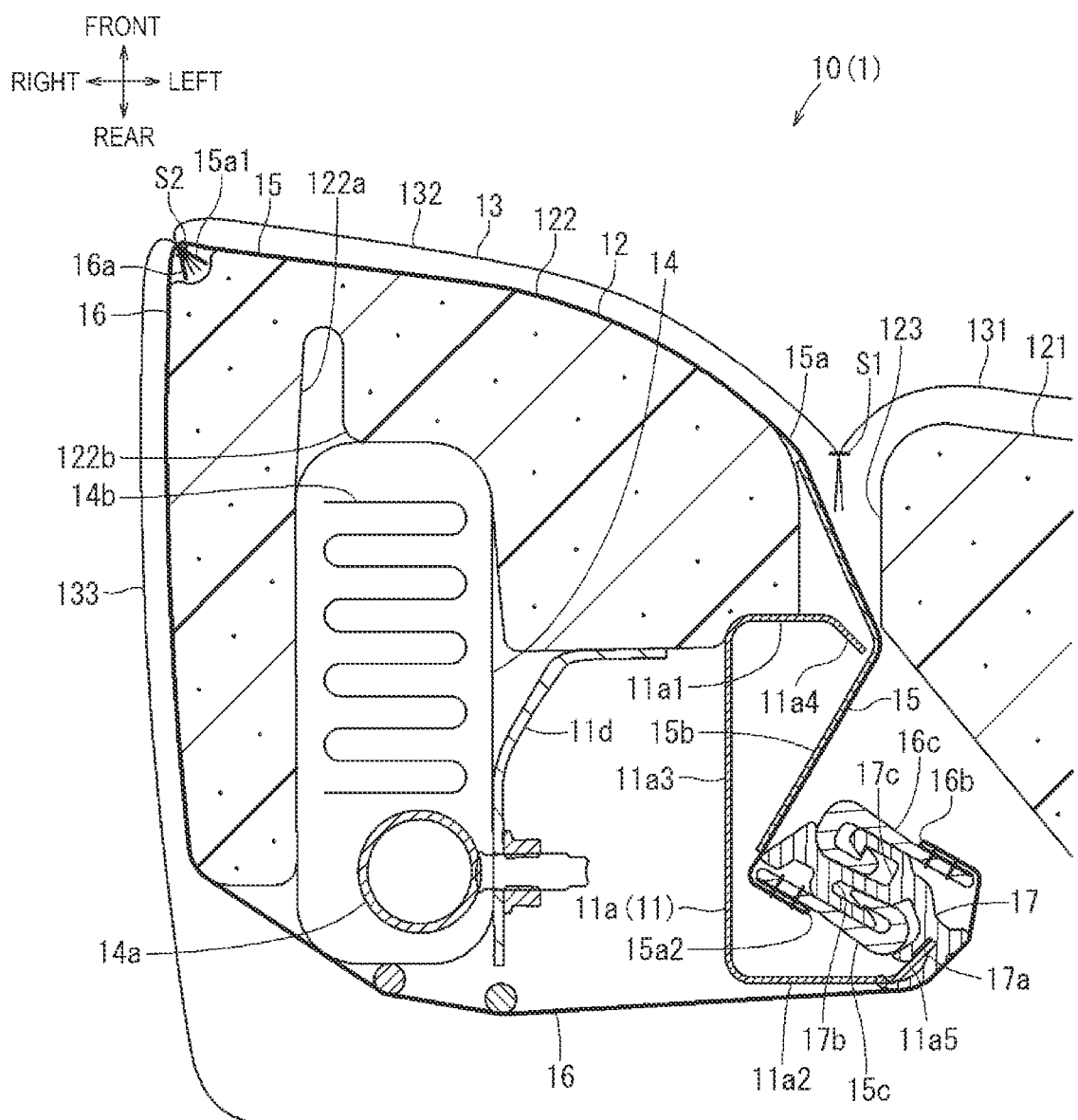
FIG. 4 is a cross-sectional view taken along an arrow line IV-IV in FIG. 2.

As shown in FIG. 4, a horizontal cross section of the side frame 11a has a substantially U-shape that opens toward a left direction (seat inside direction), and includes a front surface portion 11a1, a rear surface portion 11a2, and a side surface portion 11a3 that connects a right end portion of the front surface portion 11a1 and a right end portion of the rear surface portion 11a2 in a front-rear direction. A left end portion side (opening side) of the front surface portion 11a1 is formed as a front end surface portion 11a4 which is bent in a rearward direction, and a left end portion side (opening side) of the rear surface portion 11a2 is formed as a rear end surface portion 11a5 which is bent in a forward direction. The front surface portion 11a1 is formed to have a shorter length in a left-right direction than the rear surface portion 11a2. An airbag unit 14 is attached to a right side surface (seat outer surface) slightly above the central portion in the vertical direction of the right side frame 11a via a bracket 11d. Lower end portions of the pair of left and right side frames 11a are connected to a rear end portion of a cushion frame (not shown) via a recliner (not shown), and an inclination of the back frame 11 with respect to the cushion frame can be adjusted. The airbag unit 14 includes an inflator 14a that generates gas and an airbag 14b that is folded, and is attached to the side frame 11a by fixing the inflator 14a to the bracket 11d.

Figure 2:
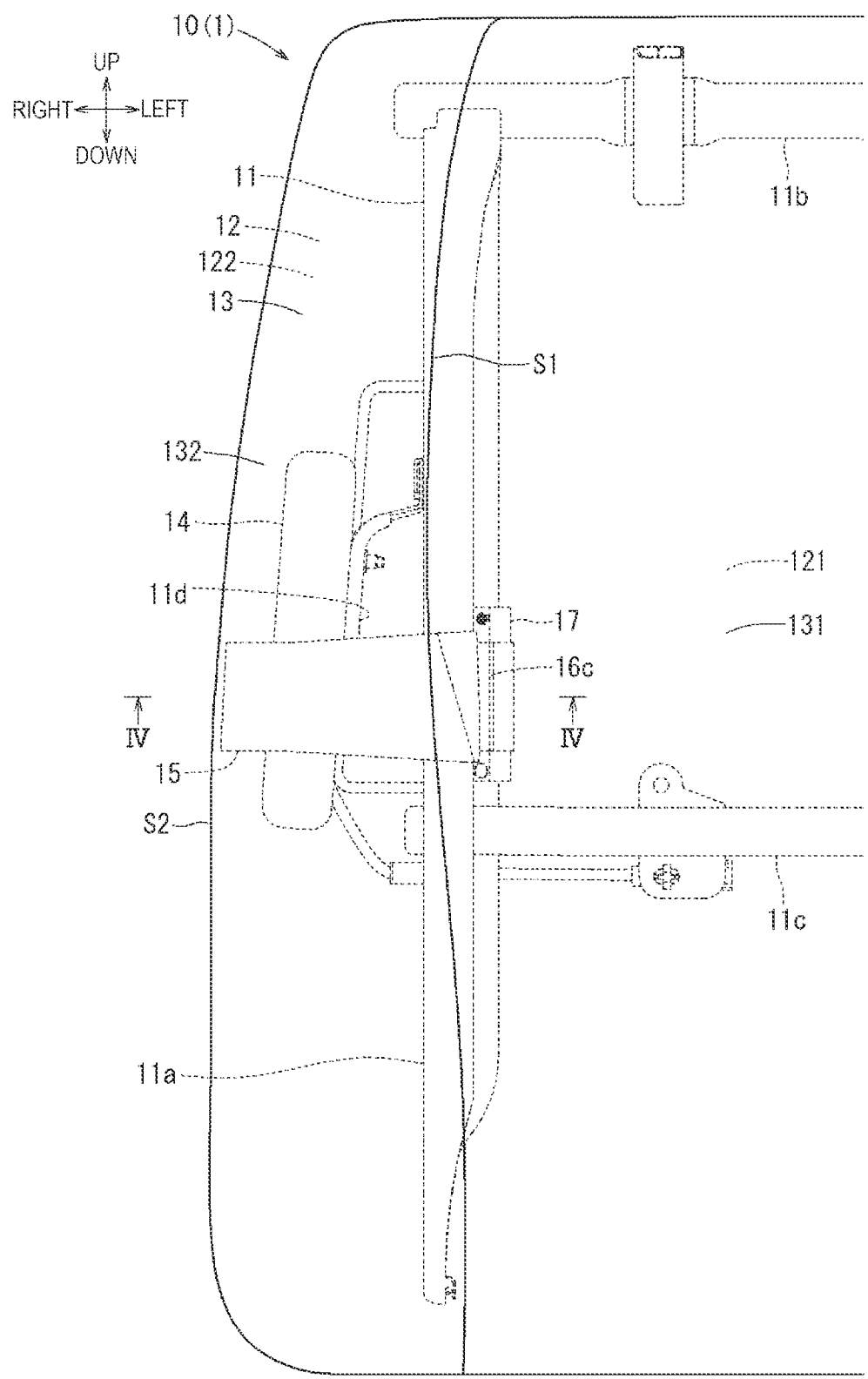
FIG. 2 is a front view of the seat back, in which only a right half is shown.

As shown in FIGS. 1, 2, and 4, the back pad 12 mainly includes a seating surface portion 121 having a seating surface of a concave shape on which a back of a seated person abuts, and a bank portion 122 supporting sides of the seated person. The bank portion 122 is located on both left and right outer sides of the seating surface portion 121, and has a convex shape projecting forward from the seating surface portion 121. The back pad 12 is attached to the back frame 11 in a state of being covered from the front with respect to the back frame 11.

In a state where the back pad 12 is attached to the back frame 11, a groove portion 122a recessed forward is provided at a position on a back surface side of the bank portion 122 which faces a front surface of the airbag unit 14. An opening portion 122b is provided to the groove portion 122a on a side of the airbag unit 14. When gas is supplied from the inflator 14a, the airbag 14b can be deployed by entering into the groove portion 122a from the opening portion 122b, pushing and expanding the groove portion 122a, and breaking the back pad 12.

As shown in FIGS. 1, 2, and 4, the back cover 13 is formed into a bag shape by sewing cut covering material parts. As the covering material, a planar member is used in which a surface cover 13a such as fabric or leather disposed on a seated person side, a urethane slab pad 13b, and a back base cloth 13c made of cotton cloth or nonwoven fabric are stacked in this order and laminated (see FIG. 7). In FIG. 4, the covering material having the three-layer structure is represented by a single solid line. There are three types of covering material parts which are: (1) a main cover portion 131 corresponding to the seating surface portion 121 of the back pad 12; (2) a side cover portion 132 corresponding to a seating surface side of the bank portion 122 of the back pad 12; and (3) a rear cover portion 133 covering a side portion of the bank portion 122 of the back pad 12 and a rear portion of the back pad 12. Only the side cover portion 132 is prepared in a pair on left and right sides.

As shown in FIGS. 1, 2, and 4, the main cover portion 131 and the left and right side cover portions 132 are sewn together by a sewing line S1, and the left and right side cover portions 132 and the rear cover portion 133 are sewn together by a sewing line S2. The sewing line S1 is drawn in the hanging groove portion 123 which is provided between the seating surface portion 121 and the bank portion 122 of the back pad 12 and is recessed toward the rear side, and is hanged and fixed. A method of hanging and fixing is a known method of locking a wire attached to a hanging cotton cloth integrally sewn by the sewing line S1 to a wire inserted in the back pad 12 by a hog ring or the like, and detailed description thereof will be omitted.

Figure 3:
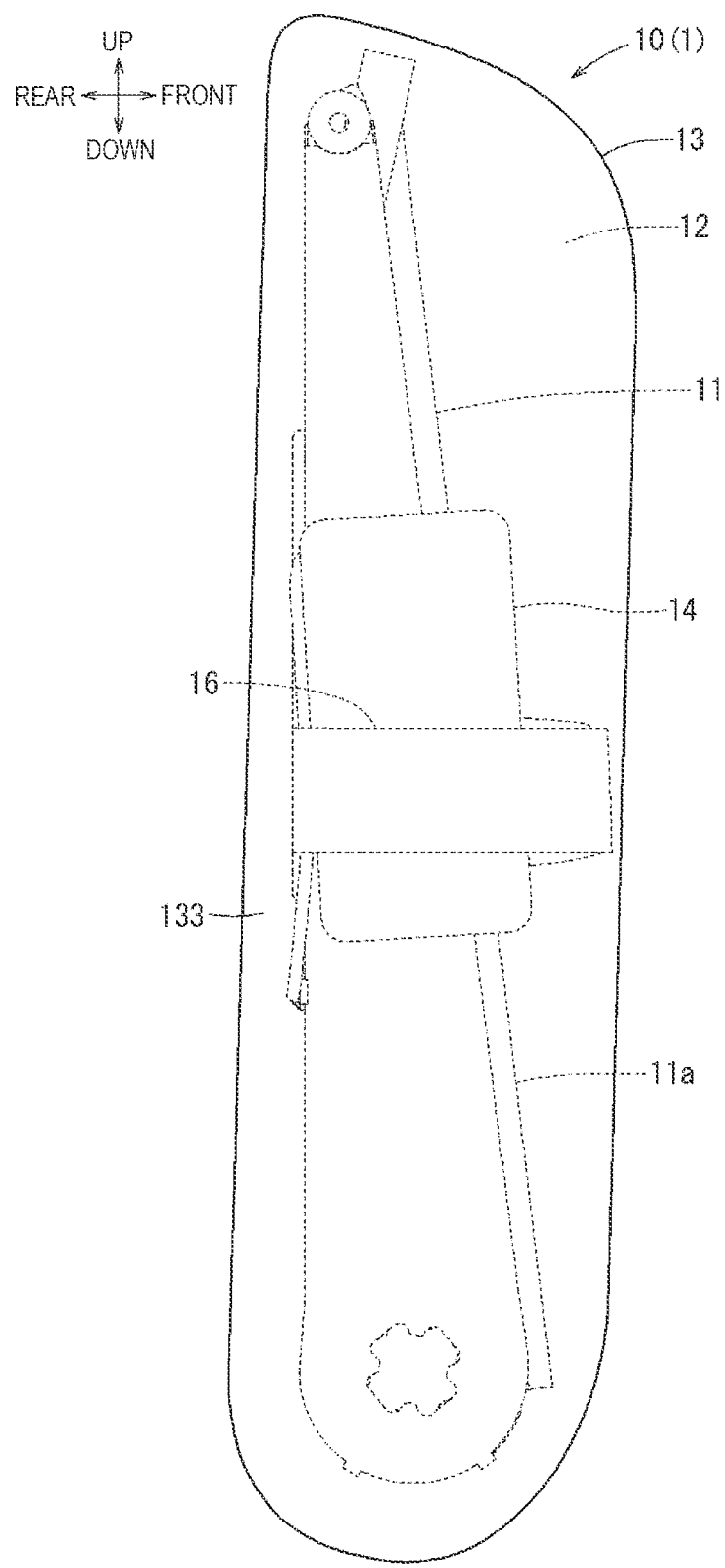
FIG. 3 is a side view of the seat back.
Figure 5:
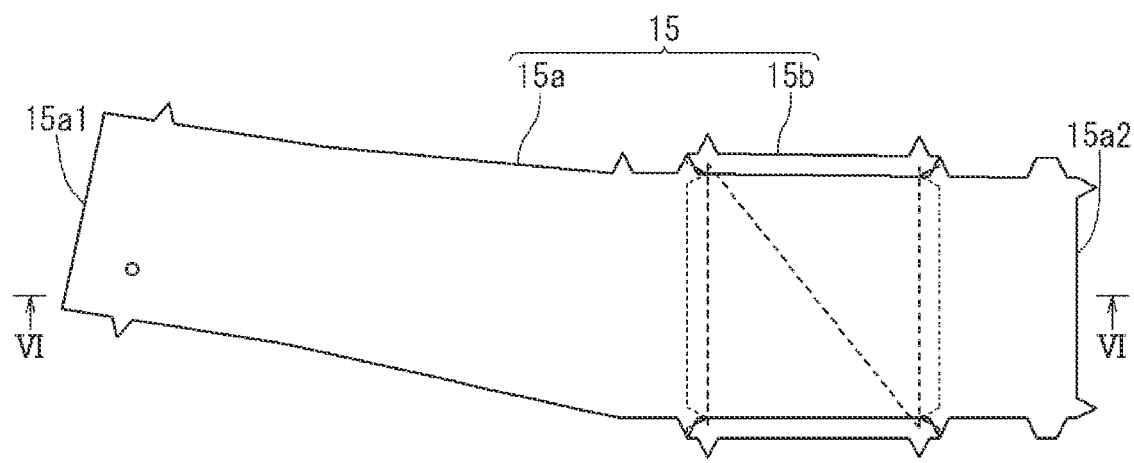
FIG. 5 is a development view of an inner side stay cloth.
Figure 6:
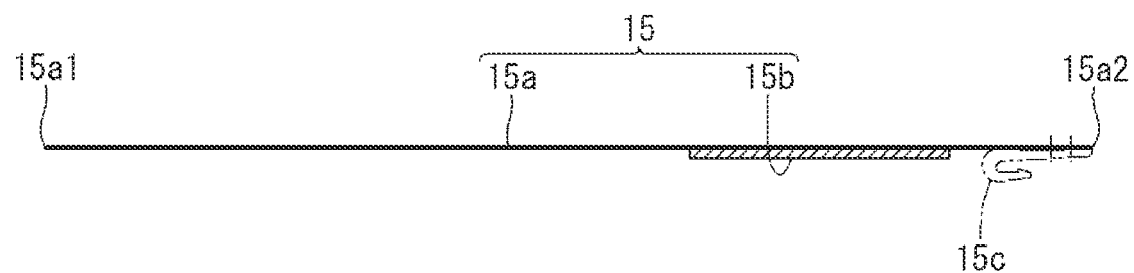
FIG. 6 is a cross-sectional view taken along an arrow line VI-VI in FIG. 5.
Figure 7:
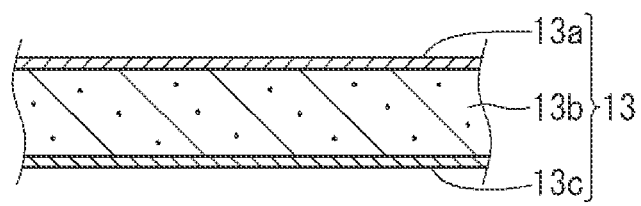
FIG. 7 is a cross-sectional view of a covering material of a back cover.

A part of the sewing line S2 is disposed at a position close to the groove portion 122a of the back pad 12 corresponding to the front of a position where the airbag unit 14 is disposed. In the part of the sewing line S2, one end portion of a belt-shaped inner side stay cloth 15 disposed on a seat inner side and one end portion of a belt-shaped outer side stay cloth 16 disposed on a seat outer side are integrally sewn to the back cover 13. As shown in FIGS. 5 and 6, the inner side stay cloth 15 includes a belt-shaped main body portion 15a having a substantially rectangular development shape, and a rectangular flat plate-shaped buffer portion 15b attached to a part of the main body portion 15a by sewing. The main body portion 15a is formed of a fabric that is difficult to stretch than the covering material of the back cover 13 such as a nylon woven fabric. The buffer portion 15b is formed of a felt material or a material obtained by laminating a resin film on the felt material. One end portion side 15a1 of the main body portion 15a in a longitudinal direction is a portion attached to the back cover 13 by the sewing line S2, and a hook member 15c made of resin is attached to the other end portion side 15a2 of the main body portion 15a in the longitudinal direction by sewing on a surface on the same side as the surface to which the buffer portion 15b is attached. The inner side stay cloth 15 is attached to the back cover 13 by the sewing line S2 in a state in which the surface of the main body portion 15a on the side to which the buffer portion 15b is attached abuts with a surface of the side cover portion 132 on a side of the back base cloth 13c. As shown in FIGS. 1, 3, and 4, the outer side stay cloth 16 is a belt-shaped member having a substantially rectangular development shape, and is formed of the same material as that of the main body portion 15a of the inner side stay cloth 15. One end portion side 16a of the outer side stay cloth 16 in the longitudinal direction is a portion attached to the back cover 13 by the sewing line S2, and a hook member 16c made of resin is attached to another end portion side 16b of the outer side stay cloth 16 in the longitudinal direction by sewing. Here, the main body portion 15a and the buffer portion 15b correspond to the "fabric member" and the "buffer member" in the claims, respectively.

As shown in FIGS. 1, 2, and 4, a stay cloth fixing member 17 is disposed on the rear end surface portion 11a5 of a portion of the right side frame 11a to which the airbag unit 14 is attached. The stay cloth fixing member 17 is a resin component that has a constant transverse section and extends in the vertical direction, and includes a groove-shaped frame attaching portion 17a that opens in a rear right direction, a groove-shaped inner side stay cloth attaching portion 17b that opens in a rear left direction, and a groove-shaped outer side stay cloth attaching portion 17c that opens in a front right direction. In the stay cloth fixing member 17, in a state where the frame attaching portion 17a is fitted and fixed to the rear end surface portion 11a5 of the side frame 11a, the hook member 15c of the inner side stay cloth 15 is locked and fixed to the inner side stay cloth attaching portion 17b, and the hook member 16c of the outer side stay cloth 16 is locked and fixed to the outer side stay cloth attaching portion 17c.

As shown in FIG. 4, the back pad 12 is fixed to the back frame 11 in a state where the back pad 12 covers the back frame 11 from the front, and the back cover 13 is covered thereon. Then, the inner side stay cloth 15 is disposed between the seating surface side of the bank portion 122 of the back pad 12 and the back base cloth 13c side of the side cover portion 132 of the back cover 13, the other end portion side 15a2 is passed through the through hole in the hanging groove portion 123 toward the rear, and the hook member 15c is locked and fixed to the inner side stay cloth attaching portion 17b. At this time, the buffer portion 15b of the inner side stay cloth 15 is disposed to face a left end portion of the front end surface portion 11a4 of the right side frame 11a, and the main body portion 15a of the inner side stay cloth 15 does not come into direct contact with the left end portion of the front end surface portion 11a4. Further, the outer side stay cloth 16 is disposed between a right surface side (side surface side) of the bank portion 122 of the back pad 12 and the back base cloth 13c side of the rear cover portion 133 of the back cover 13, and the hook member 16c is locked and fixed to the outer side stay cloth attaching portion 17c. In this state, the airbag unit 14 is wound by the inner side stay cloth 15 and the outer side stay cloth 16 via the back pad 12.

The present embodiment configured as described above has the following advantageous effects. In a state as shown in FIG. 4, when an impact load is applied to the automobile from the side of the automobile, the inflator 14a of the airbag unit 14 is activated to generate gas, and the airbag 14b starts to expand and deploy by the gas. The airbag 14b that expands and deploys enters into the groove portion 122a of the back pad 12 from the opening portion 122b, pushes and expands the groove portion 122a, and breaks the back pad 12. Further, the airbag 14b that expands and deploys pushes the back cover 13 forward, and the sewing line S2 begins to break. Specifically, the one end portion side 15a1 of the inner side stay cloth 15 and the one end portion side 16a of the outer side stay cloth 16 are integrated by sewing by a part of the sewing line S2, and since the inner side stay cloth 15 and the outer side stay cloth 16 are difficult to stretch than the back cover 13, stress is concentrated on a portion where the inner side stay cloth 15 and the outer side stay cloth 16 are sewn, and breakage starts from here. At this time, the inner side stay cloth 15 is stretched and a part of the inner side stay cloth 15 abuts against the left end portion of the front end surface portion 11a4 of the right side frame 11a, but since the buffer portion 15b is disposed in this portion, the main body portion 15a of the inner side stay cloth 15 does not come into direct contact with the left end portion of the front end surface portion 11a4. Accordingly, even if a sharp edge or the like is present at the left end portion of the front end surface portion 11a4, damage to the main body portion 15a can be avoided by the buffer portion 15b interposed between the main body portion 15a and the left end portion of the front end surface portion 11a4, and the sewing line S2 can be reliably opened by an action of the main body portion 15a to thereby expand and deploy the airbag 14b to the outside of a seat. Further, since it is only necessary to attach the hook member 15c made of resin that is attached to the other end portion side 15a2 of the inner side stay cloth 15 to the stay cloth fixing member 17 attached to the right side frame 11a, it is not necessary to attach other parts such as a protector to the side frame 11a, and thus, assembling workability of the automobile seat 1 is good.

Further, since the buffer portion 15b is attached to the surface of the main body portion 15a on a side of the right side frame 11a, when the inner side stay cloth 15 abuts with the left end portion of the front end surface portion 11a4, the main body portion 15a can be made less likely to be damaged. Further, since the buffer portion 15b is a flexible flat plate-shaped felt material, the buffer portion 15b can be easily attached to the main body portion 15a by means of sewing or the like.

Although specific embodiments have been described above, the present disclosure is not limited to the appearance and configuration thereof, and various modifications, additions, and deletions may be made without departing from the scope of the present disclosure. Examples thereof include the following.

1. In the above embodiment, the buffer portion 15b is formed of a felt material or a material obtained by laminating a resin film on the felt material. However, the present disclosure is not limited thereto, and a resin sheet, a thick fabric, or the like may be used as long as the main body portion 15a can be prevented from being damaged.

2. In the above embodiment, the buffer portion 15b is disposed on the side of the main body portion 15a which faces the left end portion of the front end surface portion 11a4 of the right side frame 11a. However, regardless of the above, although an effect of buffering is slightly inferior, the buffer portion 15b can be disposed on a side opposite to the side of the main body portion 15a which faces the left end portion of the front end surface portion 11a4 of the right side frame 11a.

3. In the above embodiment, the sewing line S2 is set as a break portion, but the present disclosure is not limited thereto. A general portion of the back cover 13 can be weakened to form the break portion.

4. In the above embodiment, the present disclosure is applied to the automobile seat, but the present disclosure is not limited thereto. The present disclosure can also be applied to seats of a railway vehicle, a ship, an aircraft, and the like.

The disclosure provides illustrative, non-limiting examples as follows:

According to a first aspect, there is provided a vehicle seat including: a back frame that forms a framework of a seat back; a back pad including a cushion material attached to a seated person side of the back frame; a back cover that covers a seated person side of the back pad; and an airbag unit that is attached to the back frame, the airbag unit including an airbag, wherein a break portion that allows the airbag to expand and deploy is formed to the back cover, wherein a fabric member that is difficult to stretch than the back cover is disposed between the break portion and the back frame, and wherein a buffer member that prevents damage due to abutment is attached to a portion of the fabric member which may abut with a part of the back frame in a process in which the airbag is expanded and deployed.

According to the first aspect, in the vehicle seat, even if a sharp edge or the like is present in a portion of the back frame with which the fabric member may abut in the process in which the airbag is expanded and deployed, the buffer member can reinforce the fabric member to avoid the damage to the fabric member. Accordingly, the break portion of the back cover can be reliably opened by an action of the fabric member to thereby expand and deploy the airbag. Further, since it is only necessary to attach the fabric member to which the buffer member is attached to the back frame, it is not necessary to attach other parts such as a protector to the back frame, and thus, assembling workability of the vehicle seat is good.

According to a second aspect, there is provided the vehicle seat according to the first aspect, wherein the buffer member is attached to a surface of the fabric member on a back frame side According to the second aspect, in the vehicle seat, since the buffer member is attached to the surface of the fabric member on the back frame side, it is possible to prevent the back frame from directly abutting with the fabric member and to make the fabric member less likely to be damaged.

According to a third aspect, there is provided the vehicle seat according to the first or second aspect, wherein the buffer member is a flexible flat plate-shaped felt material.

According to the third aspect, in the vehicle seat, since the buffer member is the flexible flat plate-shaped felt material, the buffer member can be easily attached to the fabric member by sewing or the like.

According to a fourth aspect, there is provided the vehicle seat according to any one of the first to third aspects, wherein the break portion includes a sewing line.

According to a fifth aspect, there is provided the vehicle seat according to the fourth aspect, wherein the back cover and one end portion of the fabric member are sewn together by the sewing line.

According to a sixth aspect, there is provided the vehicle seat according to any one of the first to fifth aspects, wherein the back frame includes an edge portion, and wherein the buffer member faces the edge portion of the back frame.

What is claimed is:

1. A vehicle seat comprising:
a back frame that forms a framework of a seat back;
a back pad including a cushion material attached to a seated person side of the back frame;
a back cover that covers a seated person side of the back pad; and
an airbag unit that is attached to the back frame, the airbag unit including an airbag,
wherein a break portion that allows the airbag to expand and deploy is formed to the back cover,
wherein a fabric member that is more difficult to stretch than the back cover is disposed between the break portion and the back frame, and
wherein a buffer member that prevents damage due to abutment is attached to a portion of the fabric member which may abut with a part of the back frame in a process in which the airbag is expanded and deployed.

2. The vehicle seat according to claim 1,
wherein the buffer member is attached to a surface of the fabric member on a back frame side.

3. The vehicle seat according to claim 1,
wherein the buffer member is a flexible flat plate-shaped felt material.

4. The vehicle seat according to claim 1,
wherein the break portion includes a sewing line.

5. The vehicle seat according to claim 4,
wherein the back cover and one end portion of the fabric member are sewn together by the sewing line.

6. The vehicle seat according to claim 1,
wherein the back frame includes an edge portion, and
wherein the buffer member faces the edge portion of the back frame.

* * * * *